United States Patent [19]
Hickman

[11] Patent Number: 5,160,782
[45] Date of Patent: Nov. 3, 1992

[54] WIRED GLASS

[75] Inventor: James A. A. Hickman, Edinburgh, United Kingdom

[73] Assignee: Miller Construction Limited, Edinburgh, United Kingdom

[21] Appl. No.: 415,042

[22] Filed: Sep. 28, 1989

[30] Foreign Application Priority Data

Sep. 28, 1988 [GB] United Kingdom ............... 8822780

[51] Int. Cl.5 ............................................. B32B 17/10
[52] U.S. Cl. .................................. 428/245; 428/426; 428/437; 428/911
[58] Field of Search ............... 428/437, 247, 256, 38, 428/426, 433, 245, 902, 911, 434, 458

[56] References Cited

U.S. PATENT DOCUMENTS

| | | | |
|---|---|---|---|
| 524,936 | 8/1894 | Croskey et al. | 428/38 |
| 533,512 | 2/1895 | Walsh | 428/247 |
| 548,520 | 10/1895 | Croskey et al. | 428/38 |
| 1,837,455 | 12/1931 | Lewis | 428/247 |
| 2,175,689 | 10/1939 | Gallup | 428/247 |
| 2,500,598 | 1/1950 | Axelrod | 428/133 |
| 2,659,686 | 2/1950 | Watkins | 428/437 |
| 4,029,837 | 6/1977 | Leatherman | 428/247 |
| 4,837,455 | 12/1931 | Lewis | 428/38 |

FOREIGN PATENT DOCUMENTS

| | | |
|---|---|---|
| 2171929 | 9/1972 | France . |
| 134090 | 6/1964 | New Zealand . |
| WO06096 | 8/1988 | United Kingdom . |

Primary Examiner—Ellis P. Robinson
Assistant Examiner—Archene A. Turner
Attorney, Agent, or Firm—Davis Hoxie Faithfull & Hapgood

[57] ABSTRACT

A wired glass having a wire mesh formed of wires each comprising a core and a decorative coating of different color to the core. The decorative coating provides the wired glass with an attractive visual appearance.

9 Claims, 1 Drawing Sheet

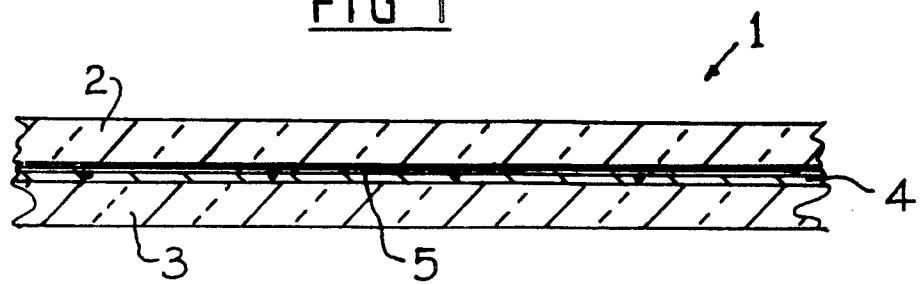
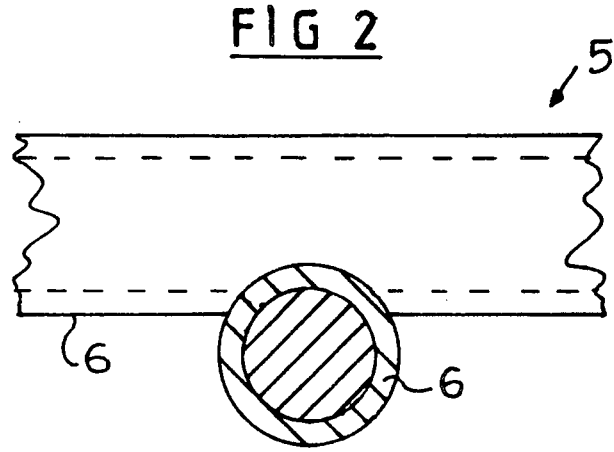

WIRED GLASS

BACKGROUND OF THE INVENTION

This invention relates to wired glass and in particular to wired glass incorporating decorative wire or wire-like material.

Conventionally wired glass is manufactured by feeding metallic wire mesh into the glass as it passes in a molten state between rollers of a roller system and then allowing the glass to solidify. It is also known from my published international patent application WO 88/06096 to bond two glazing panels, e.g. of glass, together with an interlayer of adhesive binder material and to completely embed metallic wire mesh in the interlayer. In both these cases the wire mesh acts as a reinforcement when the wired glass is struck or, more importantly, when the glass softens when exposed to intense heat, e.g. in a fire. The primary purpose of the wire mesh is to act as reinforcing means and for this reason it is usually constructed of steel wires welded together at their intersections, although other metallic wires, e.g. copper, bronze, zinc, brass or gold, may be employed. In the vast majority of cases, the wires of the conventional wire meshes have a drab appearance.

BRIEF SUMMARY OF INVENTION

The present invention seeks to provide a wired glass having an improved aesthetic appearance, preferably without loss of its reinforcing properties.

According to one aspect of the present invention a wired glass incorporating a wire mesh is characterised in that the wires of the mesh are colored so as to have a different visual appearance to metallic wires employed in conventional wired glass.

According to another aspect of the present invention a wired glass incorporating a wire mesh is characterised in that the wires of the mesh comprise a metallic core and a decorative coating colored differently to the core.

Preferably the wires of the wire mesh are colored to have a distinctive, vivid appearance, e.g. bright red, yellow or green. However the wires may be colored to have any desired visual appearance.

Preferably the decorative coating is applied as a paint by spray painting, dip painting, electrolysis, electrodeposition, e.g. anodic deposition, anodizing, enamelling, electrophoresis, electrostatic application, powder coating, e.g. by coating with powder paint, such as polyester powder paint (sold under the trade name "SYNTHAPULVIN"), and then heating the powder coating to fuse and cure it, or by any other suitable coating technique. The decorative coating is preferably applied to a steel core, e.g. to a preformed mesh of chemically treated steel wires with the wires of the mesh being electrically welded together at each intersecting or cross-over point. Conveniently the steel core wires are galvanised prior to decorative coating. Alternatively a mesh of stainless steel wires can be formed and subsequently decoratively coated.

The wire mesh may have rectangular, square, hexagonal or diamond-shaped openings, may lie substantially in a plane or may be bent or deformed out of a plane, e.g. to adopt an undulating or zig-zag form. The cross-section of the wires may be circular, oval-shaped, rectangular or any other desired section. In the preferred case the wire is of circular cross-section being steel wire of typically 0.46 mm diameter coated with a coloring layer typically of from 40 $\mu$m to 150 $\mu$m, e.g. 80 $\mu$m.

The wired glass may be of plane or curved form. In the latter case, the glass may be wired architectural glass bends, e.g. domes or curves.

Although in certain cases decorative wire mesh can be incorporated in conventional wired glass, it is preferred to bond together two glazing panels with an interlayer of adhesive binder material in which the decorative wire mesh is embedded. Typically the colored wire mesh is embedded in the interlayer by any of the methods described in WO 88/06096 although other laminating techniques could be employed. The interlayer may be of any suitable material but preferably should be heat resistant, e.g. to BS 476 Parts 20/22:1987, and safe, e.g. to BS 6206:1981. In addition the interlayer material should be selected to provide some measure of resilience (so as to absorb any heat expansion of the wire mesh caused by being subjected to intense heat, e.g. a fire) and may be transparent or translucent, clear or tinted. Examples of suitable interlayer resins are methacrylate, acrylic, polycarbonate, polyester, diethylene glycol bis allyl carbonate, silicate or epoxy resins, or any suitable resin compound containing more than one epoxy group (situated internally) terminally or on cyclic structures capable of being connected to useful thermoset forms. The glazing panels are preferably of glass, which may be toughened glass, annealed glass or emissivity or solar control glass, but may alternatively be of plastics material, e.g. acrylic, PERSPEX (Registered Trade Mark), PVC, polycarbonate or the like. The term "wired glass" used in this specification is intended to embrace glazing panels incorporating such plastics glazing sheets.

The coloring of the wires of the wire mesh gives an attractive visual appearance to wired glass enhancing the aesthetic qualities of the glass. This is especially so when the colored wire mesh is embedded in an interlayer of binding material since the embedding process does not distort the wire mesh (as in the conventional method of manufacturing wired glass) leaving uniformly shaped mesh openings highlighting the attractive visual appearance of the colored wire mesh. It will be appreciated that since the colored wire mesh is deliberately highlighted in the wired glass, the need to make the wires as thin as practically possible no longer applies. Accordingly thicker wires than conventionally employed may, if desired, be used in wired glass according to the invention. Preferably the wire mesh will be colored to have a color different to that of wire mesh used in conventional wired glass. However it is possible to deliberately color the wire mesh to have a different metallic appearance, e.g. to color steel wire a gold color. It will be appreciated that special effects or patterns can be produced by only partially coating the wire mesh or by applying coatings of different colors to provide colored patterns, e.g. striped patterns, of two or more colors. The wire will most conveniently be colored after it has been formed into its mesh form.

Wired glass incorporating colored wire mesh may be used for many different applications, e.g. in shopping malls, conservatories, public buildings, schools, shelving, shop displays, door screens, room dividers and laylights.

BRIEF DESCRIPTION OF DRAWINGS

An embodiment of the invention will now be described, by way of example, with reference to the accompanying drawing, in which:

FIG. 1 is a sectional view through part of a panel of wired glass according to the invention, and FIG. 2 is a sectional view, on an enlarged scale, through colored wired mesh for use in the wired glass shown in FIG. 1.

DETAILED DESCRIPTION OF INVENTION

FIG. 1 shows a wired glass 1 according to the invention consisting of two spaced apart glazing panels 2 and 3, each 3 mm thick, bonded together by an interlayer 4 of adhesive resin material, e.g. methacrylate resin, typically about 1.2 mm thick. A colored wire mesh 5 having substantially square openings, is embedded substantially centrally between the glazing panels 2 and 3 within the interlayer 4. The interlayer 4 is transparent and has a degree of resilience to allow for expansion and contraction of the wire mesh 5.

The wire mesh 5 (see FIG. 2) is formed of chemically treated steel wires arranged in a grid and electrically welded together at their cross-over or intersection points. Typically the mesh wires have a diameter of 0.46 mm. The preformed wire mesh 5 is coated with a layer 6 of brightly colored paint, having a different color to the steel wire, by any convenient process, e.g. by an electrostatic spraying process involving spraying charged paint powder particles onto the mesh and subsequently heating the mesh 5 to fuse and cure the paint powder coating. Typically the layer 6 has a thickness of from 40-150 μm although greater paint thicknesses are possible.

The invention will now be described with reference to the following non-limitative example.

EXAMPLE

Conventional chemically treated steel wire mesh of the kind produced by Pilkington Brothers PLC for conventionally produced wired glass and having a square mesh formed of a grid of wires electrically welded together at their crossover points was cut to form a sheet of a size of 1 m by 1 m. The individual wires of the mesh had a diameter of 0.46 mm and the mesh size was approximately 12.5 mm by 12.5 mm.

The wire mesh was earthed and charged fluidised particles of brightly colored, e.g. red, polyester powder paint were electrostatically sprayed on to the earthed wire mesh. Following the paint powder application, the wire mesh was passed through an oven for approximately ½ hour to heat the wire mesh to a temperature of 180° C. to 200° C. for 10 minutes to fuse and cure the powder coating. In this manner the wires of the wire mesh were coated with a colored coating having a thickness of approximately 80 μm.

The wire mesh was then sandwiched between two square glass panels (each slightly larger than the wire mesh sheet) peripherally sealed and spaced apart from each other by double sided adhesive tape applied so as to be sandwiched between facing peripheral portions of the glass panels. Premixed settable liquid resin material, e.g. methacrylate resin material, having a pouring kinematic viscosity of from 2.59 cSt to 5.97 cSt, was then poured between the sheets and allowed to set thereby binding the glass panels together. The decoratively coated wire mesh was found to "float" into a central position in the resin interlayer prior to the latter setting. The precise method of locating the wire mesh between the glass panels and introducing the liquid resin material between the glass panels is described in more detail in the specification of WO 88/06096.

In this specification, the term "wired glass" is intended to cover a decorative wired construction consisting of a single glazing panel adhered, by an adhesive layer incorporating a colored wire mesh, to an opaque panel of any suitable material, e.g. a suitably colored glazing panel or a suitably colored metallic panel. For example a clear glazing panel, typically of glass, may be bonded by an adhesive interlayer containing a colored, e.g. yellow, wire mesh to a colored, e.g. black, metallic sheet to provide a decorative glazing feature with a colored wire mesh visible against a backing of contrasting color.

Throughout this specification reference to "conventional(ly) wired glass" is intended to refer to so-called monolithic wired glass made by the conventional method of feeding metallic wire mesh into the glass as it passes in a molten state between rollers of a roller system and allowing the molten glass to solidify with the wire mesh embedded therein.

This invention can be embodied in other forms without departing from the spirit or essential attributes thereof and, accordingly, reference should be made to the appended claims, rather than to the foregoing specification, as indicating the scope thereof.

I claim:

1. A wired glass incorporating a wire mesh, characterised in that the wires of the mesh comprise a metallic core and a decorative coating of paint colored differently from the core; and in that the wire mesh is embedded in an interlayer of adhesive binder material which bonds together two spaced apart glazing panels.

2. A wired glass according to claim 1, characterised in that the decorative coating has a bright or vivid color.

3. A wired glass according to claim 1, characterised in that the decorative coating is applied by spray painting.

4. A wired glass according to claim 1, characterised in that the decorative coating is applied by dip painting.

5. A wired glass according to claim 1, characterised in that the decorative coating is applied by one of electrolytic coating, anodizing, electrodeposition and electrophoresis.

6. A wired glass according to claim 1, characterised in that the decorative coating is applied by enamelling.

7. A wired glass according to claim 1, characterised in that the decorative coating is applied by the use of a paint powder coating technique.

8. A wired glass incorporating a wire mesh, characterised in that the wires of the mesh are colored with paint so as to have a visual appearance different from metallic wires employed in conventional wired glass; and in that the wire mesh is embedded in an interlayer of adhesive binder material which bonds together two spaced apart glazing panels.

9. A wired glass comprising two transparent outer sheets bonded together by an interlayer of adhesive binder material; and a mesh embedded in said material and formed from intersecting metallic wires, each of said wires having an individual coating of paint around its outer surface with a color different from the color of the metal from which the wire is made.

* * * * *

UNITED STATES PATENT OFFICE
CERTIFICATE OF CORRECTION

PATENT NO. : 5,160,782
DATED : November 3, 1992
INVENTOR(S) : James A.A. Hickman It is certified that error appears in the above-identified patent and that said Letters Patent is hereby corrected as shown below:

Col. 4, lines 38-39 (Claim 2), delete "bright or vivid color" and substitute --non-metallic appearance--.

Signed and Sealed this

Fifth Day of October, 1993

*Attest:*

BRUCE LEHMAN

*Attesting Officer*   *Commissioner of Patents and Trademarks*